United States Patent [19]

Kobelt

[11] 4,148,115
[45] Apr. 10, 1979

[54] SELF-CLOSING FASTENER

[76] Inventor: Volkmar Kobelt, Bockeroth, Friedrichshoher Strasse 33, Königswinter, Fed. Rep. of Germany

[21] Appl. No.: 741,493

[22] Filed: Nov. 12, 1976

Related U.S. Application Data

[63] Continuation-in-part of Ser. No. 582,922, Jun. 2, 1975, Pat. No. 4,035,875.

[30] Foreign Application Priority Data

Nov. 13, 1976 [DE] Fed. Rep. of Germany ....... 2550927

[51] Int. Cl.² .............................................. A44B 19/00
[52] U.S. Cl. ................................... 24/201 R; 24/201 C
[58] Field of Search ............. 24/204, 201 HH, 201 C, 24/201 R

[56] References Cited

U.S. PATENT DOCUMENTS

| 2,353,858 | 7/1944 | Tedesco | 24/201 C |
| 3,070,864 | 1/1963 | Pfeffer | 24/201 C |

FOREIGN PATENT DOCUMENTS

| 1084488 | 9/1953 | France | 24/201 C |
| 521051 | 9/1953 | Italy | 24/201 C |

Primary Examiner—Kenneth J. Dorner
Attorney, Agent, or Firm—Spencer & Kaye

[57] ABSTRACT

A fastener has two interengageable halves. Each half has first and second elements extending along the length dimension of the fastener. The two elements are interconnected, in a direction transverse to the length of the fastener, by a resilient part which is tensioned in the separated state of the fastener and relaxed in the joined state. In the zone of the separated state the tensioned state of the resilient part is maintained by a stable engagement of the first and second elements of each fastener half. In the zone of the joined state the first elements of the two halves are in an interengaging stable relationship. During release of the first first element with respect to the second element of each fastener half in the presence of the first element of the one fastener half between the two elements of the other fastener half, the resilient parts urge the first elements into the respective other fastener half and effect self-propagation of the boundary between the zones of the separated state and the joined state.

1 Claim, 7 Drawing Figures

SELF-CLOSING FASTENER

CROSS-REFERENCE TO RELATED APPLICATION

This is a continuation-in-part of application Ser. No. 582,922, filed June 2, 1975, now U.S. Pat. No. 4,035,875, issued July 19, 1977.

BACKGROUND OF THE INVENTION

This invention relates to a self-closing, linear, slideless fastener having resilient parts which at their respective locations serve for effecting the self-propagation of the boundary between zones of different states of connection (that is, separated state and joined state of the fastener).

In the above-identified related application slideless fastener arrangements are described wherein the connection is effected by a mechanical engagement, basically similar to the conventional slide fasteners or profile strip fasteners. In or between the movably arranged parts structured to perform the engagement function, there are provided resilient parts which in one of the two states of connection are in a tensioned condition and which, at the boundary between the two zones of different states of connection assume, during propagation of the boundary, a relaxed condition due to their particular position there and thereby cause a further propagation of the boundary.

An in itself separate class of fasteners was formed by arrangements wherein the two halves of the fasteners have a profile of constant cross section along the length of the fastener and the two halves are made of a continuous elastic material affixed to the two articles to be temporarily attached to one another. The elastic halves interengage in a manner similar to the profile strip fasteners but, viewed in cross section, they can assume different stable configurations with different elastic tension energy. These stable configurations are associated with the different states of connection so that the difference of the tensional energies furnishes the propelling force to cause propagation of the boundary.

The above arrangements of constant cross section may further be so structured and positioned as to improve various properties, particularly, to provide improved bending properties (flexibility). In general, arrangements having a profile of constant cross section, and their before mentioned generalizations, may be characterized in this manner: Along the fastener, at the individual articles, there extend coherent but sufficiently mobile (for example, flexible) parts or chains of parts of each fastener half. These parts or chains of parts will be hereafter generally referred to as elements. These are, among one another and transversely to the fastener, coupled by resilient parts in each fastener half. As the elements move with respect to one another, a transition is possible particularly from one state of higher spring bias into another state of a lower spring bias or no spring bias at all. The states may be stable even in the presence of spring bias by so structuring the elements that, for example, they may hook into one another or they may lie on interpositioned additional parts or they may retain each other in arrangements for the automatic dissolution of the connection or, at the respective locations the several tensioned parts mutually maintain their tension.

The states of the different tensions, as it was generally mentioned above, are associated with different states of connection of the fastener. They may also exist side by side along the fastener zones based on the mobility of the elements. Conversely, the retension (coherence) in the elements effects, viewed spatially, a not too discontinuous transition at the boundary between the zones of the different states of connection so that the tension at a location which is no longer in a stable state of high tension is still capable to pull out adjacent parts from the stable state of higher tension (for example, to unwind from a support). By virtue of contact between the elements of the different, temporarily connected portions of the fastener halves the relaxation (release of tension) cannot occur without an accompanying shift of the boundary between the different states of connection. In general, by shifting the boundary with an outer force, for example, by pulling the separated ends apart, this process can even be reversed. The above-noted contact functions may be performed to a greater or lesser extent by the adjoining zones of the resilient parts which are to be regarded as zones of the correspondingly-structured elements.

Fasteners having two elements connected to one another, by means of, for example, arcuate, deformable resilient parts are of particular significance. In self-closing fasteners, the elements mutually support one another in the tensioned state. These fasteners have been described in the above-identified related application as being longitudinally slit-open tubes, particularly of the type whose walls are made of an elastic material which may resiliently be bent away or towards one another and which may have additional structural features for performing other functions. The two elements are to be considered as being arranged at the edges or in the vicinity of the edges, whereas the bent wall constitutes the resilient connection. Thus, in the description below, longitudinally split tubes and their two edges are to be understood as having the above-discussed properties.

Fasteners of the above type for the self-closing of two articles have also been of symmetrical structure wherein the interengaging fastener halves were identically formed or at least were designed according to identically determined characteristics. These have the advantage that both halves have an active effect so that the cross section in general may be maintained at an overall smaller value. The two halves of the symmetric arrangements described earlier, however, are, in the connected state, hooked to one another to a greater extent at the edge so that the connection, based on a leverage effect, is more sensitive to outer effects. Further, the hollow spaces necessary for the motion of the springs in the fastener halves are present twice in the connected state and, viewed in cross section, particular structuring at the edges is necessary for the mutual holding effect and the mutual guidance at the boundary.

SUMMARY OF THE INVENTION

It is an object of the invention to provide an improved self-closing fastener which has a more compact shape in the connected state and effects a more stable connection while the structural requirements are reduced.

This object and others to become apparent as the specification progresses, are accomplished by the invention, according to which, briefly stated, the fastener has two interengageable halves. Each half has first and second elements extending along the length dimension of the fastener. The two elements are interconnected, in a direction transverse to the length of the fastener, by a resilient part which is tensioned in the separated state of the fastener and relaxed in the joined state. In the zone of the separated state the tensioned state of the resilient part is maintained by a stable engagement of the first and second elements of each fastener half. In the zone of the joined state the first elements of the two halves are in an interengaging stable relationship. During release of the first element with respect to the second element of each fastener half in the presence of the first element of the one fastener half between the two elements of the other fastener half, the resilient parts urge the first elements into the respective other fastener half and effect self-propagation of the boundary between the zones of the separated state and the joined state. Thus, in the separated state the first and second elements in each fastener half are in engagement with one another and in this manner maintain the tensioned state of the resilient part in a stable condition. During reduction of tension, on the other hand, the first element moves with respect to the second element and is curled into the respective fastener half so that the first elements of the two fastener halves will assume an interconnected relationship with reduced or zero tension in the associated resilient part. Thus, the first element of the one fastener half is drawn inside the other fastener half and conversely. In the joined state the fastener has as a whole, a radially symmetrical configuration.

It is an advantage of the fastener structured according to the invention as outlined above, that there is achieved a better interengagement of the active parts and, for a fastener of symmetrical configuration, a compact structure is provided.

DESCRIPTION OF THE PREFERRED EMBODIMENTS

Figure 1:
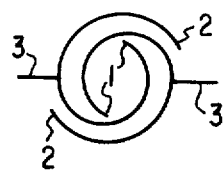
FIG. 1 is a schematic cross-sectional view of a preferred embodiment of the invention shown in a joined (connected) position.

Turning now to FIG. 1, each half of the fastener structured according to the invention comprises spirally coiled tubes that are longitudinally slit open. The two fastener halves are shown in a zone of joined state; each tube has a first part terminating in an inner edge 1 and a second part terminating in an outer edge 2. Both tubes are shown in a relaxed (non-tensioned) condition. Stated more generally, the structure includes elements extending longitudinally at the location of the tube edges and resiliently deformable, arcuately shaped transversal connections at the location of the tube wall. Longitudinally extending carrier members or supports for attaching such carrier members are designated at 3.

Figure 2:
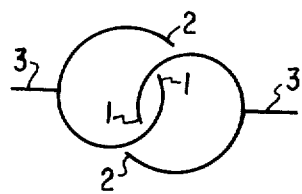
FIGS. 2 and 3 are schematic cross-sectional views of the same embodiment showing it in different intermediate positions between the joined and separated positions.
Figure 3:
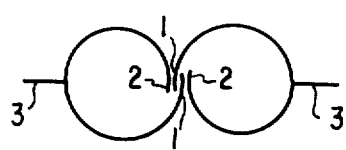

FIGS. 1, 2, 3 and 4 sequentially show a transition at the boundary between the zones of the different positions of connection. This transition can be viewed as occurring in time sequence at the same location as a result of the conditions of a cross section upon pulling apart the separated ends by an external force, or the transition may be viewed as occurring at different locations at one given point in time as different states of a series of cross sections at the boundary between the two zones. It is seen that by means of the mutual interengagement of the inner edges 1 behind one another, the latter mutually pull each other outwardly, as shown in FIG. 2, until they are, as shown in FIG. 3, situated externally of the previously outer respective edges 2. After the edges 1 slide out of engagement with respect to one another, the respective edges 1 of the two tubes rest in a stable manner on the associated edges 2; in this condition the resilient transverse connections are tensioned or, at least they are tensioned to a more significant extent than in the condition shown in FIG. 1. The resilient parts are dimensioned expediently in such a manner that in the conditions assumed approximately between those illustrated in FIGS. 2 and 3, the force between the edges 1 and 2 also has a component which forces them against one another in order to thus make possible the stable transition.

Thus, the edges 1 guide one another in a stable manner in the boundary zone past the edges 2 outwardly in case of a separation by pulling the halves apart, viewed as a function of either time or space. It is noted that based on the interconnection in the elements, not all the states of the individual cross sections have to be stable by themselves. For example, in FIG. 2, the edges need not be maintained or need not be maintained completely in the tensioned state (as shown) by contact with parts of the other fastener half. Accordingly, such a transition need not be explainable by considering a single cross section in an isolated manner. It is further to be noted that such a transition is effected less by the opening forces from the direction of the carrier bands (it is precisely these components which are to be supported), than by means of pulling apart the separated ends.

Figure 4:
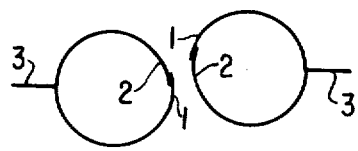
FIG. 4 is a schematic cross-sectional view of the same embodiment shown in a separated position.
Figure 4A:
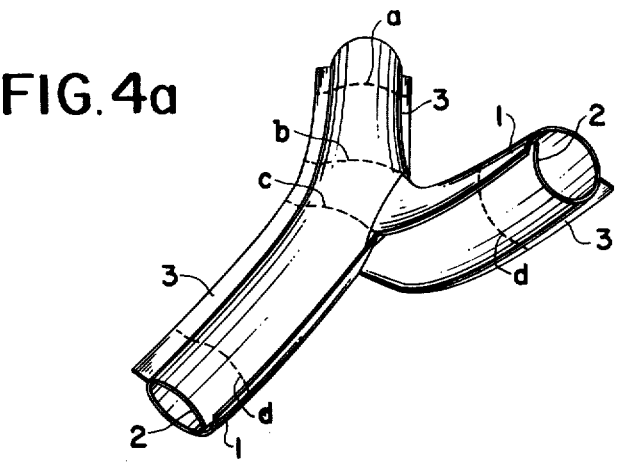
FIG. 4a is a perspective view of the same embodiment showing the different fastener positions.
Figure 4B:
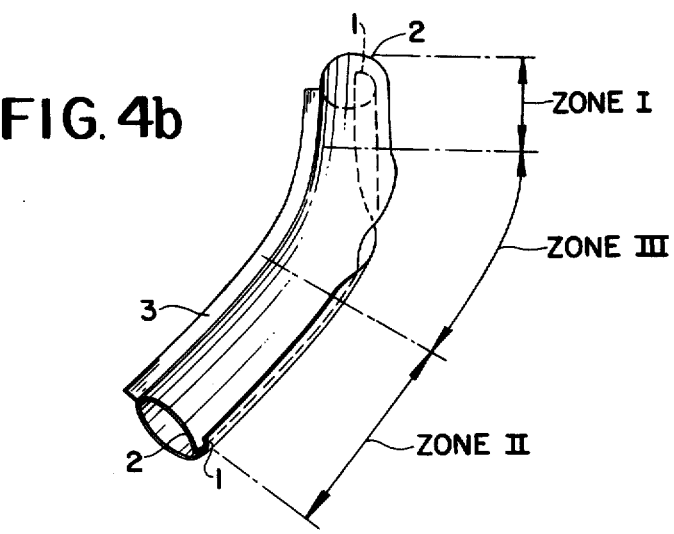
FIG. 4b is a perspective view of a single fastener half in different fastener positions.

FIG. 4a is a perspective view of the fastener illustrated cross-sectionally in FIGS. 1–4, while FIG. 4b shows a single fastener half for more clearly illustrating the different positions each fastener half assumes in cooperation with the other fastener half. In FIG. 4a dotted lines a, b, c and d indicate, respectively, the location of the sectional planes of the cross-sectional FIGS. 1, 2, 3 and 4.

The two fastener halves which, as seen in FIGS. 1–5, have identical configurations, can assume two stable states and an unstable state.

In the first stable state, each fastener half is relaxed, that is, no potential energy is stored therein. Such a condition is shown in the schematic FIG. 1 and in the structural cross-sectional FIG. 5. In this first stable state, the two fastener halves are in an engaged condition; in that zone, which is designated zone I in FIG. 4b, the fastener is closed. In the first stable state each fastener half assumes a spiral configuration in which the edge portion 1 is situated radially inwardly of the edge portion 2.

Each fastener half can further assume a second stable state in which it is in a tensioned condition, that is, it stores potential energy. Viewing the fastener as a whole, in the second stable state the two fastener halves are separated from one another. This state is shown in FIG. 4 as well as along zone II in FIG. 4b. In the second stable state (tensioned condition) the spiral configuration of the fastener halves (which they have in the first stable state) has practically disappeared since the walls thereof have been spread outwardly. In this state the edge portion 2 is situated inwardly of the edge portion 1.

The unstable state of the fastener, which is illustrated in FIGS. 2 and 3 as well as along zone III in FIG. 4b, will be discussed in the operational description which will now be set forth.

First, a transition from the first stable state (relaxed condition) to the second stable state (tensioned condition) will be described.

It is assumed that the fastener is closed, that is, along a desired length portion the fastener halves are in an interengaging relationship and each fastener half is in its first stable state (relaxed condition) as shown, for example, in FIGS. 1 and 4b (zone I). This closed condition can also be termed as the "first position" of the fastener.

A transition from the first stable state (relaxed condition) into the second stable state (tensioned condition) of the fastener halves occurs during the separation (opening) of the fastener assembly. Such a separation is effected by the application of an external force, for example, applied at the carrier member 3 of each fastener half. The forces are such that the two fastener halves at the location of force application are urged away from one another. Thus, by virtue of the externally applied force, the two spirals of the fastener halves are gradually uncurled and during this process, in each fastener half, the edges 1 and 2 change places, that is, the edge 1 which was the inner edge in the first stable state (relaxed condition) will now become the outer edge; the reverse applies to the edge 2. It is noted that such a positional change has occurred at a time between the condition shown in FIG. 2 and the condition shown in FIG. 3.

When the fastener halves are, in the zone II as shown in FIG. 4b, completely separated from one another (FIG. 4), the two halves are in their second stable state (tensioned condition). This completely separated (open) condition can also be termed as the "second position" of the fastener.

In case the fastener opening operation is terminated at a time when a part is still in the interengaging condition (that is, in the first position), an external immobilizing force is needed to maintain the fastener halves separated from one another. Otherwise, as will now be described, an automatic reclosing will occur.

A transition from the second stable state (tensioned condition) into the first stable state (relaxed condition) will now be described. Such a transition takes place automatically, that is, entirely without the application of an external aiding force.

As shown in FIG. 2 and essentially along zone III in FIG. 4b, the fastener halves are in a partially interengaged condition which also can be termed as the "third position" of the fastener. Due to the mutual—although partial—interengagement of the fastener halves into one another, the stable relationship that characterized the one and the other fastener halves in their respective second stable state when they were in the "second position" no longer exists. This mutual interengagement in the "third position" causes the stored potential energy to be released. The force derived from this energy release causes an inward curl of edge 1 seeking to assume the first stable state (relaxed condition) of FIG. 1 and also exerts a force to the neighboring portion of the partially interengaged fastener halves shown in FIG. 3. This force is sufficiently large to cause the FIG. 2 configuration to be further rolled in, thus flipping inwardly the edge 1 which is externally of the edge 2 in the FIG. 3 section. There thus occurs a downward (as viewed in FIGS. 4a and 4b) propagation of the zone III, resulting in an automatic closing (interengaging) of the fastener halves. The force exerted by the potential energy which is being released in the unstable state is thus sufficient to dissolve the second stable state and thus, as part of the propagation of this boundary zone, the edge 1 which is the outer edge in the second stable state (tensioned condition) will be drawn over the edge 2, whereby a transition from the condition shown in FIG. 4 to that of FIG. 3 and that of FIG. 2 takes place. As the boundary zone propagates, the FIG. 2 position changes into the FIG. 1 position, whereby the fastener halves assume their first state (relaxed condition) in which they are in full interengagement ("first position") as a result of the automatic closing operation. This self propagation (automatic closing) of the boundary zone (zone III in FIG. 4b) proceeds to the terminus of the fastener or until such propagation is encountered by a sufficiently large opposing external force.

Thus at the boundary, in the intermediate states corresponding to the position shown in FIG. 2, the edges 1 draw one another into the inside of the fastener by virtue of the resilient tension and, by virtue of the longitudinal interconnection, adjoining cross sections are pulled from the state shown in FIG. 4 into the state shown in FIG. 3. In this manner the boundary has evidently wandered through a certain distance without a change in its structure; this continues until the end.

Regarding arrangements with constant cross section, more generally the energy considerations may be examined which are as follows: assuming a stability of the state of connection at the boundary when the ends of the fastener are immobilized, this state can be assumed in exactly the same form at each location in an inner zone of the fastener; the state can also be shifted, since the parts need only to assume the state of the adjacent parts, these states themselves being neighboring states of the states of the former parts. In case the zone of the joined state is increased, the zone having the greater spring tension will decrease by the extent the zone with the smaller spring tension will increase. The difference between the spring energies can disappear only through the separated fastener ends by means of a force which pulls these ends together.

Figure 5:
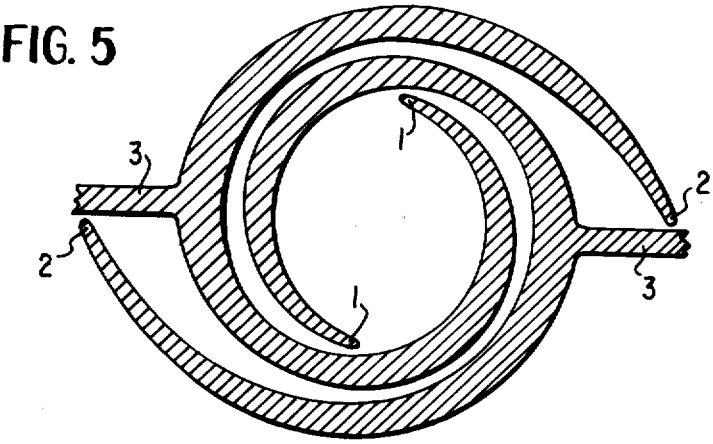
FIG. 5 is a cross-sectional view of a practical realization of the same embodiment.

Turning now to FIG. 5, there is shown a practical embodiment in cross section. This embodiment which may be made of a resilient plastic material, is illustrated in the connected and relaxed (i.e., not tensioned) state. In normal applications for the connection of parts of fabric, this embodiment might have a thickness of approximately half a centimeter; then, in cross section the spiral shaped tube extending from 1 to 2 gets a length of 16 mm; the distance between the edges 1 and 2 of the relaxed tube will equal 3.7 mm, and the thickness of the wall at member 3 will equal 0.7 mm (somewhat larger than drawn, relatively). The fastener may be made of India rubber modified polypropylene of a module of elasticity of approximately 2,000 kg/cm$^2$.

Considering now either half of the fastener, the cross-sectionally spiral wall of the slit-open tube seeks to assume a circular form upon bringing together and connecting the edges 1 and 2. The force acting between the edges has a component which urges these edges against one another to make possible the stable state as shown in FIG. 4. The constant course of thickness and curvature of the wall is of significance. It is furthermore feasible to design shapes which have a more pronounced curvature or hook-shaped edges or which do not assume the above-noted circular configuration. The wall thickness is, for the sake of clarity, drawn smaller than it actually would be for the purpose of a firm interconnection in the joined state. Further, in the joined state there may exist a pre-tension for improving the interconnection and the ratio of the tensional energy to the frictional energy. The wall can, for the purpose of providing an improved flexibility of the fastener, be segmented so that only webs along the edges 1 and 2 and possibly along the attachment 3 remain. The latter web may be omitted if a more loose interconnection solely by means of the carrier band is desired. The arcuate segments between the edges 1 and 2 may be so shaped and arranged that in the connected state they penetrate into the gaps between the segments of the other fastener half in order to prevent, in the longitudinal direction, a local shift of the fastener halves with respect to one another. In this manner a mobility transversely to the surface of the carrier band is achieved (the carrier band surface is defined substantially by the two attachments 3), similarly to the behavior of conventional slide-type fasteners having discrete elements. Further, a corresponding mobility of the individual halves is achieved; the fastener halves are to move away from one another approximately "tangentially", that is, perpendicularly to the surface of the carrier bands. In this case not only the distance between the remaining arcuately-shaped components plays a role but also their shiftability with respect to one another. It is preferred that in such a case a thickening of the edges 1 and 2 should be effected for a better interconnection and a better guidance in the transitional zone. With regard to flexibility and stability in the tensioned state in case of a substantial bending it is of advantage if all three parts which effect the interconnection lie approximately in the plane of the carrier bands. The insert itself may also be segmented and additionally provided with eyelets or the like. Or, instead, it may be provided with perpendicularly drilled holes for the same purpose. It is further feasible to secure the carrier band directly to the back side of the (segmented) wall.

The configuration of the FIG. 5 embodiment makes possible a dimensioning (as it was the case in other, earlier-described fastener embodiments) wherein even in case of a forcible opening by pulling apart the inserts 3, within the connected states the ends 1 and 2 lock in a stable tensioned condition in the joined state so that this motion, too, may be automatically reversed.

Expediently, as noted above, the fastener halves may be made of a synthetic material and may be shaped by extrusion or injection molding. Metal as a material may be used for the configuration in FIG. 4 only in case of sufficiently thin shells because of the distortions that take place. In any event, a segmentation is preferred; the interconnected parts may be made in the form of chains with links of mutually limited mobility. An embedment into or a bond with a synthetic material may also be feasible; this could effect a smooth but movable interconnection in the longitudinal direction.

In conventional profile strip fasteners with sliders there occurs the inherent problem that a requirement for small friction upon motion of the slide and a requirement for a film interconnection in the zone of the joined state are mutually counteracting. Such a problem should not occur in the present embodiment or other embodiments having a constant cross section. In the present case, in the zone of the boundary no space has to be provided for a slide and further, the freedom of structural choice is greater than in cases where a slide has to move over smooth surfaces at all locations. Further, by pulling apart the fastener ends, the opening (separation) can be effected with greater ease even against a greater force than by the manipulation of a slide.

The above-described symmetric arrangement has the advantage that by means of the interengagement of the relatively inwardly moving edges the effect of such a movement is reinforced, thus a space-saving "boxed-in" arrangement is obtained. It is a further advantage that the outer edges and adjoining areas may be so shaped as to surround and contact the other half of the fastener in the joined state so that a relative rotation into the separated state is counteracted by lever action. It is a further advantage that for the mutual guidance and support the structure at the edges is greatly simplified.

It will be understood that the above description of the present invention is susceptible to various modifications, changes, and adaptations, and the same are intended to be comprehended within the meaning and range of equivalents of the appended claims.

What is claimed is:

1. In a self-closing slideless fastener for joining or separating articles along a distance of indeterminate length, formed of two cooperating symmetrical fastener halves each including a resilient, longitudinally open tubular member; the fastener having a first position in which the fastener halves are in a fully interengaging condition along at least one part of the fastener length; the fastener having a second position in which the fastener halves are in a fully disengaged condition along at least one part of the fastener length; the fastener having a third position in which the fastener halves are in a partially interengaging condition along a boundary zone between a length portion in which the fastener is in its first position and a length portion in which the fastener is in its second position; the improvement wherein each said fastener half has a first part terminating in a first longitudinal edge portion and a second longitudinal edge portion; each said fastener half having a first stable state in which the fastener half is fully relaxed along at least one part of the fastener length; in said first stable state said first edge portion of said first part is spaced from and is internally of said second edge portion of said second part when viewed in a direction radially outwardly from the inside of the fastener half; said fastener being in said first position when said fastener halves are in said first stable state; each said fastener half further having a second stable state in which each fastener half is tensioned along at least one part of the fastener length, whereby potential energy is stored therein; in said second stable state said first edge portion of said first part is in engagement with and and is externally of said second edge portion of said second part when viewed in a direction radially outwardly from the inside of the fastener half; in said second stable state said first part of each said fastener half being urged by its own resiliency radially inwardly towards the said first stable state and is prevented to move thereinto by the resisting force of the second part of the respective fastener half; said fastener being in said second position when said fastener halves are in said second stable state; each said fastener half further having an unstable state in which said first edge portion of said first fastener half is in engagement with said second edge portion of said second fastener half and extends around said second edge portion of said first fastener half; in said unstable state further said first edge portion of said second fastner half is in engagement with said second edge portion of said first fastener half and extends around said second edge portion of said second fastener half; said fastener being in said third position when said fastener halves are in said unstable state; in said unstable state the potential energy stored in said second stable state being released whereby the fastener halves change over from their respective unstable state into their first stable state and longitudinally adjacent length portions of the fastener halves change over from their respective second stable state into their unstable state effecting a self-propagation of said boundary zone.

* * * * *